UNITED STATES PATENT OFFICE.

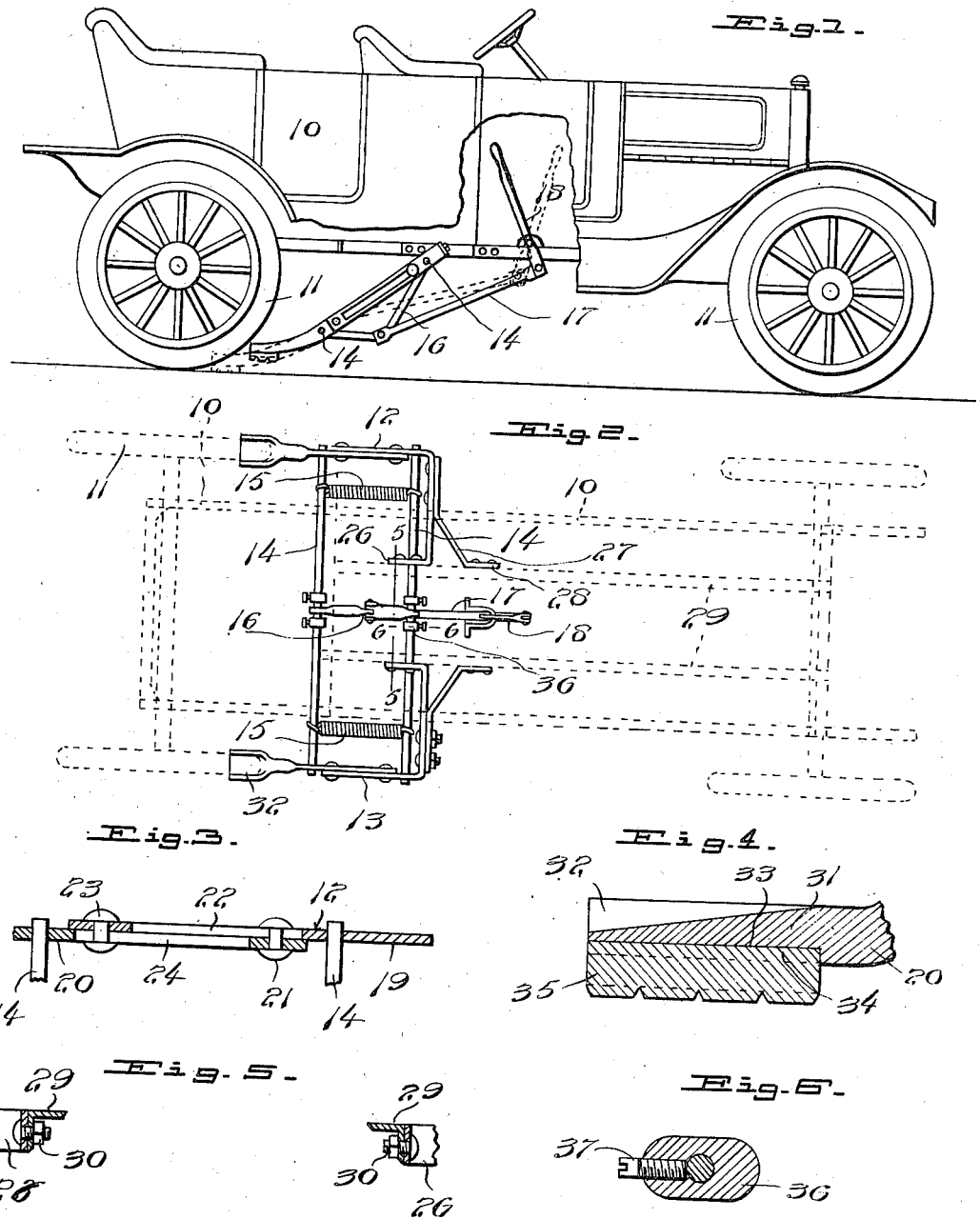

EDWARD HINES, OF LOUISVILLE, KENTUCKY, ASSIGNOR OF FORTY-NINE ONE-HUNDREDTHS TO FRED TROSS, JR., OF LOUISVILLE, KENTUCKY.

ANTISKIDDING DEVICE FOR AUTOMOBILES.

1,093,416. Specification of Letters Patent. Patented Apr. 14, 1914.

Application filed October 14, 1913. Serial No. 795,030.

*To all whom it may concern:*

Be it known that I, EDWARD HINES, a citizen of the United States, residing at Louisville, in the county of Jefferson, State of Kentucky, have invented certain new and useful Improvements in Antiskidding Devices for Automobiles; and I do hereby declare the following to be a full, clear, and exact description of the invention, such as will enable others skilled in the art to which it appertains to make and use the same.

This invention relates to anti-skidding devices for automobiles and has for an object to provide an extremely strong and effective brake mechanism that may be dropped underneath the rear wheels of the automobile and will bear forcibly upon the roadbed whereby to positively prevent skidding of the machine without burning of the rear tires.

A further object of the invention is to provide a brake mechanism which may be instantly applied and released and which will be formed of a few simple parts that are strong and durable and will not easily get out of order.

With the above objects in view the invention consists of certain novel details of construction and combination of parts hereinafter fully described and claimed, it being understood that various modifications may be made in the minor details of construction within the scope of the appended claim.

In the accompanying drawing illustrating this invention:—Figure 1 is a side elevation of an automobile equipped with my improved brake mechanism. Fig. 2 is a top plan view of the brake mechanism with the automobile shown in dotted lines. Fig. 3 is a longitudinal sectional view through one of the sides of the frame. Fig. 4 is a longitudinal sectional view through one of the shoes. Fig. 5 is a longitudinal sectional view on the line 5—5 Fig. 2. Fig. 6 is a fragmentary sectional view on the line 6—6 Fig. 2.

Referring now to the drawing in which like characters of reference designate similar parts, 10 designates a conventional automobile and 11 the rear wheels thereof. In carrying out my invention I arrange a drop frame beneath the automobile in advance of the rear wheel, the frame comprising opposite similar extensible sides 12 and 13 which are connected by spaced cross bars 14 the latter being movable toward or away from each other according to whether the sides are extended or retracted and being normally held close together by spaced helical springs 15. A toggle lever 16 has the terminals of its legs connected to the respective cross bars, and a connecting link 17 connects the elbow of the toggle lever with an operating lever 18 secured to the vehicle within convenient reach of the operator's seat. Upon the lever being shoved forwardly the toggle lever will be expanded with a resultant spreading apart of the cross bars 14 against the tension of the springs 15, the cross bars serving to extend the sides of the frame whereby the lower ends of such sides pass beneath the rear wheels and bear forcibly upon the ground whereby the vehicle is halted without burning of the tires as often happens when sudden emergency stops are to be made with ordinary brakes now in general use.

Each side of the frame comprises a stationary section 19 and a movable section 20 which carries a pin 21 that works in a slot 22 in the stationary section, the stationary section also carrying a guide pin 23 which works in a slot 24 in the movable section. The stationary section is bent inwardly at the upper end as shown at 25 and is then bent rearwardly as shown at 26, the inwardly bent portion being equipped with a brace 27 having a forwardly bent portion 28, the rearwardly bent portion of the stationary section and the forwardly bent portion of the brace being bolted to a longitudinal angle iron 29 as shown at 30, which angle iron is in turn bolted or otherwise secured to the bottom of the automobile.

It is obvious that to promote the proper working of the device one of the cross bars 14 is disposed to connect the stationary sections of both sides while the other cross bar is disposed to connect the movable sections of both sides so that upon actuation of the toggle lever the movable sections will be extended as above described.

The lower end of each movable section is provided with a flattened offset portion 31 the top face of which is provided with a groove 32 to receive the tire of the adjacent rear wheel, and the bottom face of which is provided with a groove 33 to receive a rib 34 formed on a flat shoe 35 the bottom face of which is knurled or roughened in any desired manner to engage with the ground.

The legs of the toggle lever are secured to the related cross bars 14 by means of collars 36 adjustably secured on the cross bars on opposite sides of the legs by means of set screws 37 or otherwise.

In operation, the springs normally hold the extensible sides retracted to dispose the brake shoes above the roadbed. When the operator desires to make a quick stop without danger of skidding, the operating lever is shoved forwardly whereby the toggle lever is expanded with a resultant extending of the sides to dispose the rear portions of the sides underneath the rear wheels whereby the rear wheel tires are raised from the roadbed and the shoes bear forcibly upon the roadbed with a resultant quick stopping of the machine without burning of the tires.

What is claimed, is:—

A vehicle brake including a frame adapted to be fixedly connected to the vehicle body in advance of the wheels to be braked, said frame including spaced sides each comprising an upper stationary section and a lower section slidably secured to the upper section and terminating in a brake shoe, a cross bar connecting the upper sections of both sides, a second cross bar connecting the lower sections of both sides, helical springs connecting said cross bars and normally holding said lower sections retracted, a toggle lever having the legs connected to said cross bars, and means connected to said toggle lever for expanding the toggle lever to move said lower sections away from said upper sections to dispose said brake shoes underneath said wheels whereby the wheels are raised from the roadbed and the brake shoes bear forcibly upon the roadbed.

In testimony whereof, I affix my signature, in the presence of two witnesses.

EDWARD HINES.

Witnesses:
J. H. ELLIS,
FRED ALSMEYER.